United States Patent
Moriyama

(10) Patent No.: US 10,489,621 B2
(45) Date of Patent: Nov. 26, 2019

(54) READING DEVICE AND MOBILE TERMINAL

(71) Applicant: CASIO COMPUTER CO., LTD., Tokyo (JP)

(72) Inventor: Teppei Moriyama, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/906,714

(22) Filed: Feb. 27, 2018

(65) Prior Publication Data
US 2018/0253577 A1    Sep. 6, 2018

(30) Foreign Application Priority Data

Mar. 1, 2017    (JP) .................................. 2017-037911

(51) Int. Cl.
| | |
|---|---|
| G06K 7/10 | (2006.01) |
| G06K 7/14 | (2006.01) |
| H04N 1/00 | (2006.01) |
| H04N 1/047 | (2006.01) |

(52) U.S. Cl.
CPC ..... *G06K 7/10722* (2013.01); *G06K 7/10594* (2013.01); *G06K 7/1413* (2013.01); *H04N 1/00334* (2013.01); *H04N 1/047* (2013.01)

(58) Field of Classification Search
CPC ... G06K 7/10722; G06K 7/14; G06K 7/10732
USPC .................................................. 235/462.41
See application file for complete search history.

(56) References Cited

U.S. PATENT DOCUMENTS

| | | | |
|---|---|---|---|
| 5,821,518 A | 10/1998 | Sussmeier et al. | |
| 2003/0085284 A1 | 5/2003 | Bremer et al. | |
| 2012/0160910 A1 | 6/2012 | Hammer | |
| 2013/0306730 A1* | 11/2013 | Brady ................ | G06K 7/10792 235/455 |
| 2014/0203071 A1* | 7/2014 | Eggert ............. | G06K 19/06112 235/375 |
| 2015/0278566 A1* | 10/2015 | Hammer ............ | G06K 7/10574 235/462.32 |

FOREIGN PATENT DOCUMENTS

| | | |
|---|---|---|
| JP | 2005-63142 A | 3/2005 |
| JP | 2005-250808 A | 9/2005 |

OTHER PUBLICATIONS

European Search Report dated Jul. 11, 2018, in a counterpart European patent application No. 18159284.1.
Japanese Office Action dated Aug. 20, 2019, in a counterpart Japanese patent application No. 2017-037911. (A machine translation (not reviewed for accuracy) attached.).

* cited by examiner

*Primary Examiner* — Ahshik Kim
(74) *Attorney, Agent, or Firm* — Chen Yoshimura LLP

(57) ABSTRACT

A reading device includes: an imaging unit that acquires an image by imaging an object; and a reading unit that emits a scanning light having a prescribed scanning angle range in a prescribed one-dimensional direction and that detects the scanning light reflected by the object so as to acquire a target information displayed on the object. The imaging unit and the reading unit are disposed such that a center line of the prescribed scanning angle range of the scanning light and an optical axis of the imaging unit intersect with each other at a point that is away from the reading device by at a prescribed distance.

10 Claims, 11 Drawing Sheets

READING DEVICE AND MOBILE TERMINAL

BACKGROUND OF THE INVENTION

Field of the Invention

The present invention relates to a reading device and a mobile terminal.

Description of Related Art

A reading device that includes a one-dimensional scanner and a two-dimensional scanner so as to read different bar codes via the one-dimensional scanner and the two-dimensional scanner is well-known, for example (see Japanese Patent Application Laid-Open Publication No. 2005-63142, for example).

Even though such a reading device of a mobile terminal device can read different bar codes via the one-dimensional scanner and the two-dimensional scanner, such a device cannot synchronize the reading of the bar code with imaging of an object on which the bar code is displayed.

SUMMARY OF THE INVENTION

Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a reading device, including: an imaging unit that acquires an image by imaging an object; and a reading unit that emits a light beam towards the object in a scanning manner to emit a scanning light having a prescribed scanning angle range in a prescribed one-dimensional direction, and that detects the scanning light reflected by the object so as to acquire a target information displayed on the object, wherein, the imaging unit and the reading unit are disposed such that a center line of the prescribed scanning angle range of the scanning light and an optical axis of the imaging unit intersect with each other at a point that is away from the reading device by a prescribed distance.

In another aspect, the present disclosure provides a mobile terminal, including: a camera that acquires an image by imaging an object; and a scanner that emits a light beam towards the object in a scanning manner to emit a scanning light having a prescribed scanning angle range in a prescribed one-dimensional direction, and that detects the scanning light reflected by the object so as to acquire a target information displayed on the object, wherein, the camera and the scanner are disposed such that a center line of the prescribed scanning angle range of the scanning light and an optical axis of the camera intersect with each other at point that is away from the mobile terminal by a prescribed distance.

In another aspect, the present disclosure provides a reading device, including: a camera that acquires an image by imaging an object; and a scanner that emits a light beam towards the object in a scanning manner to emit a scanning light having a prescribed scanning angle range in a one-dimensional prescribed direction, and that detects the scanning light reflected by the object so as to acquire a target information displayed on a surface of the object, an emission direction of the scanning light being changeable; and a processor that performs: determining whether or not the surface of the object and an optical axis of the camera are perpendicular to each other; when the surface of the object and the optical axis of the camera are determined to be perpendicular to each other, acquiring distance information indicating a distance from the camera to the object; and causing the scanner to change the emission direction of the scanning light in accordance with the acquired distance information such that a center line of the prescribed scanning angle range of the scanning light and the optical axis of the camera intersect with each other on the surface of the object.

It is to be understood that both the foregoing general description and the following detailed description are exemplary and explanatory, and are intended to provide further explanation of the invention as claimed.

BRIEF DESCRIPTION OF THE DRAWINGS

A deeper understanding of the present application can be obtained by referring to the drawings described below alongside the detailed descriptions given later.

DETAILED DESCRIPTION OF EMBODIMENTS

Figure 1:
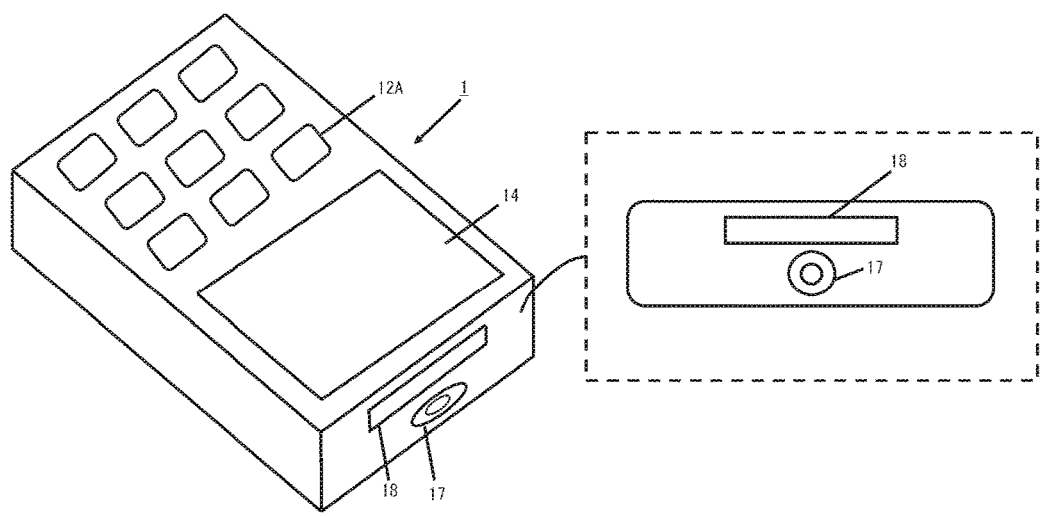
FIG. 1 shows a schematic configuration of a reading device.

Embodiments of the present invention will be described in detail below with reference to the attached drawings. The present invention is not limited to the examples shown in the drawings.

First, a schematic configuration of a reading device 1 will be described with reference to FIG. 1. FIG. 1 shows a schematic configuration of the reading device 1.

The reading device 1 (mobile terminal) is a handy terminal such as that shown in FIG. 1, for example, which is used in order to gather data for work, and can read bar codes (target information to be read) displayed on forms and perform imaging of the forms. The object is not limited to forms, and may be anything that includes a barcode, such as products sold in a store, or the like, for example. In addition, the reading device 1 is not limited to a handy terminal, and may be other information terminal devices such as a smartphone, a tablet PC (personal computer), a notebook PC, a PDA (personal digital assistant), or the like.

As shown in FIG. 1, the reading device 1 has: operation keys 12A; a display unit 14; an imaging unit 17; and a reading unit 18.

The operation keys 12A are a keypad that receives operational input, and are used in order for a user to perform necessary operational input. Examples of operational input include: input of numbers and letters; trigger input for performing reading via the reading unit 18 and imaging via the imaging unit 17; or the like.

The display unit 14 is configured using an LCD (liquid crystal display), ELD (electroluminescent display), or the like, and has the role of displaying necessary information to the user. In addition, the display unit 14 may be configured using a pressure-sensitive touch panel, an electrostatic touch panel, or the like, and may be configured so as to be able to fulfill the role of operational input. Furthermore, the display unit 14 includes a speaker that is able to output sound, and the like.

The imaging unit 17 (camera) is configured using a digital camera that can capture still images. The imaging unit 17 has: a lens; an imaging element; various types of sensors; an analog processing unit; and a digital processing unit, and is able to image an object as a result of an object image from the imaging lens being formed on the imaging element.

The reading unit 18 (scanner) is a laser scanner that reads one-dimensional bar codes and includes: a light source; a light-receiving unit; a gain circuit; and a binarization circuit. Specifically, the barcode is irradiated by a scanning light generated by swing a light source at a prescribed scanning width (scanning angle range) in a one-dimensional prescribed direction, and reflected light thereof is received by the light-receiving unit and converted into an electric signal. Then, the converted electric signal is amplified by the gain circuit, and is converted into binary data by the binarization circuit to be output. The reading device 1 also includes a drive unit 18A that is able to control the inclination of the reading unit 18 so as to be able to change the emission direction of the scanning light. The present embodiment was configured so as to incline the reading unit 18, but the present invention is not limited to this. Since it is sufficient for the device to be able to change the emission direction of the scanning light, a mirror that reflects the scanning light in a prescribed direction may be prepared, and the drive unit 18A may be configured to control the inclination of the mirror. In such a configuration, the reading unit 18 is able to change the emission direction of the scanning light without moving the reading unit 18 itself.

The imaging unit 17 and the reading unit 18 are disposed near each other on the same surface of the reading device 1, as shown in FIG. 1, for example. As a result, it is possible, when reading a bar code using the reading unit 18 of the reading device 1, to capture an object on which a bar code is displayed at an angle of view that represents a range at which imaging is possible via the imaging unit 17. Then, when the bar code is read by the reading unit 18, since imaging is carried out by the imaging unit 17, the device is configured to be able to simultaneously acquire the code information of the bar code and the image of the object.

In addition, as will be explained in more detail later, the reading unit 18 and the imaging unit 17 are disposed such that the center in the scanning width direction of the scanning light emitted from the reading unit 18 intersects the optical axis of the imaging unit 17 at a prescribed location. The optical axis of the imaging unit 17 represents an axis that passes through the center of the angle of view in the imaging direction.

Figure 2:
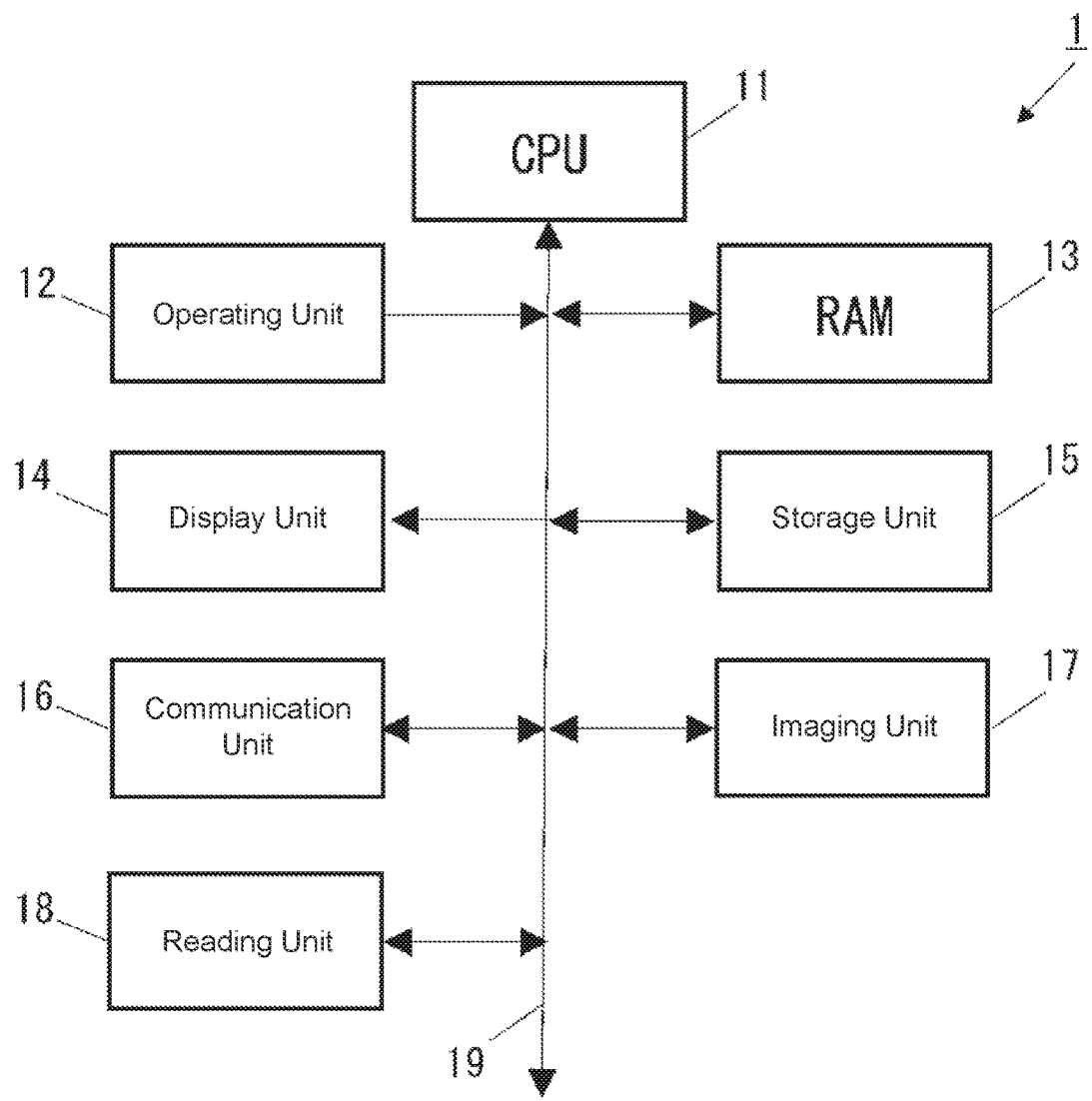
FIG. 2 is a block diagram that shows a physical configuration of the reading device.

Next, a physical configuration of the reading device 1 will be described with reference to FIG. 2. FIG. 2 shows the physical configuration of the reading device 1.

As shown in FIG. 2, the reading device 1 includes: a CPU (central processing unit) 11; an operating unit 12; RAM (random access memory) 13; the display unit 14; a storage unit 15; a communication unit 16; the imaging unit 17; the reading unit 18; and a bus 19. The respective units of the reading device 1 are connected via the bus 19. Since the display unit 14, imaging unit 17, and reading unit 18 are as described above, a description thereof will be omitted here.

The CPU 11 controls the respective units of the reading device 1. The CPU 11 reads designated programs from among the system programs and application programs stored in storage unit 15, loads the programs into the RAM 13, and executes various types of processing in coordination with the programs loaded into the RAM 13.

The operating unit 12 is, in other words, the operation keys 12A. The operating unit 12 includes a touch panel provided on the screen of the display unit 14.

The RAM 13 is volatile memory that temporarily stores information, and has a work area for storing various types of data and programs.

The storage unit 15 (memory) is configured to have ROM (read-only memory), flash memory, or the like, for example, and stores, in addition to the operating system, programs, applications, code information acquired via the imaging unit 17 and the reading unit 18, and the like. The storage unit 15 may be configured to include portable, removable memory such as an SD card, an IC (integrated circuit) card, or the like, and may include a prescribed external server storage area (not shown) when the device is connected to a network via a communication function, for example.

The communication unit 16 includes: a wireless communication antenna; a modulation unit for transmission signals; a demodulation unit for received signals; and the like, and is able to carry out wireless communication with an access point provided on a communication network, for example.

Figure 3:
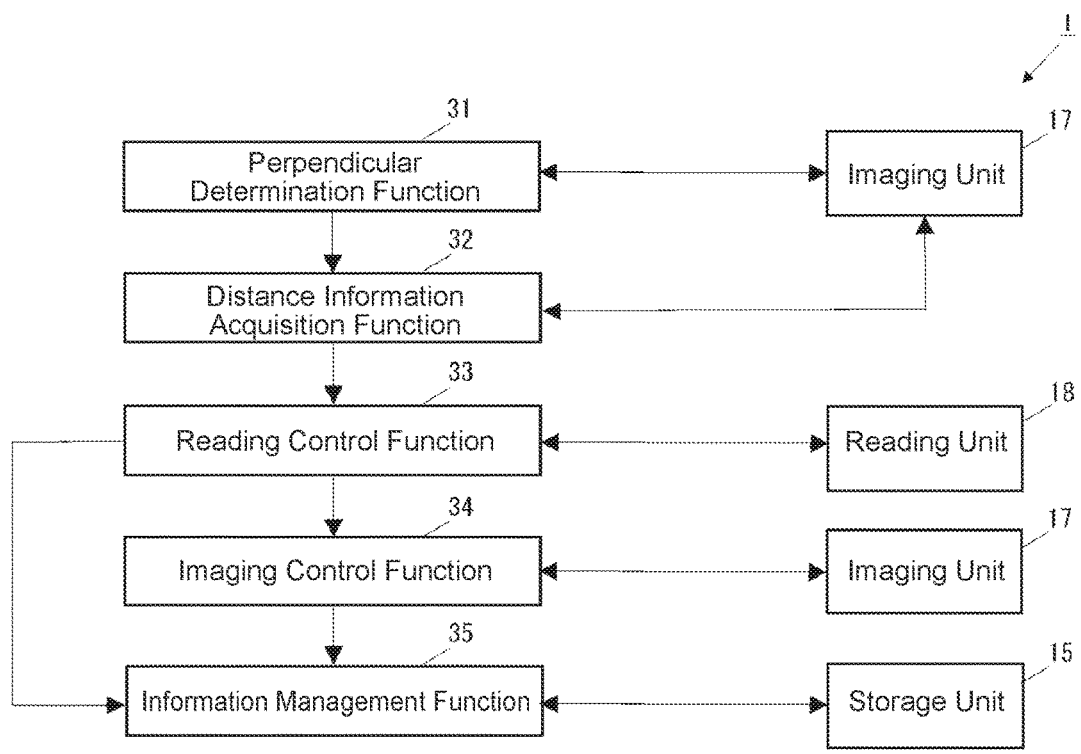
FIG. 3 is a block diagram that shows a functional configuration of the reading device.

Next, a functional configuration of the reading device 1 will be described with reference to FIG. 3. FIG. 3 is a block diagram that shows the functional configuration of the reading device 1.

The reading device 1 has the following functions: a perpendicular determination function 31; a distance information acquisition function 32; a reading control function 33; an imaging control function 34; and an information management function 35.

When a user attempts to read a bar code and image an object on which the bar code is displayed by using the reading device 1, the perpendicular determination function 31 determines whether the optical axis of the imaging unit 17 is perpendicular with respect to the object. This is performed in order to avoid having the object be skewed when imaging via the imaging unit 17. This determination is made by the imaging unit 17 that detects an angle formed between the optical axis and the object, and by the CPU 11 that makes a determination based on the detection results. The present invention is not limited to using the imaging unit 17, however, and a level or the like that is able to detect inclination may be provided instead.

When the perpendicular determination function 31 has determined that the optical axis of the imaging unit 17 is perpendicular to the object, the distance from the imaging unit 17 to the object is measured by the distance information acquisition function 32 to acquire distance information. Here, the acquisition of the distance information is carried out by using the imaging unit 17; the present invention is not limited to this, however. Another type of distance measuring sensor that uses LEDs or lasers may be provided, for example.

In addition, it is possible to omit the distance information acquisition function 32. In other words, the user may input the distance information to the object via the operating unit 12 beforehand. In such a case, the user must perform reading and imaging while maintaining a prescribed distance from the object. However, it is no longer necessary to acquire the distance information every time, and it is also no longer necessary to set the angle of the reading unit 18, which will be described later, every time.

The reading control function 33 sets an emission direction of the scanning light in accordance with the distance information acquired by the distance information acquisition function 32, and emits the set scanning light. In the present embodiment, the emission direction of the scanning light is set by setting the angle at which the reading unit 18 is inclined. This will be described in more detail using FIG. 5. By setting this angle, it is possible to avoid a phenomenon in which reading of the bar code becomes impossible due to the scanning light being emitted from the front surface, and it is possible to make it more likely for the object to be within the angle of view when imaging via the imaging unit 17, which is carried out afterwards. Then, when it has been confirmed that emission of the scanning light has started, the user moves the reading device 1 so as to irradiate the bar code with the scanning light. Once the code information of the bar code is acquired via the reading unit 18, the reading device 1 outputs the acquired code information to the CPU 11. When the user moves the reading device 1, it is necessary to move the reading device 1 in a direction parallel to the object. This is because it is necessary to maintain the perpendicular state determined by the perpendicular determination function 31 and the distance measured by the distance information acquisition function 32.

The imaging control function 34, performs control such that the imaging unit 17 carries out imaging successively after the reading control function 33 has read the code information. Thus, the reading device 1 is configured such that reading by the user using the reading unit 18 triggers the imaging unit 17 to carry out imaging.

The information management function 35 matches up the code information acquired via the reading unit 18 and the image acquired via the imaging by the imaging unit 17, and stores this information and the image in the storage unit 15. In addition, it is possible to call up the information stored in the storage unit 15 and display this information on the display unit 14.

Figure 4:
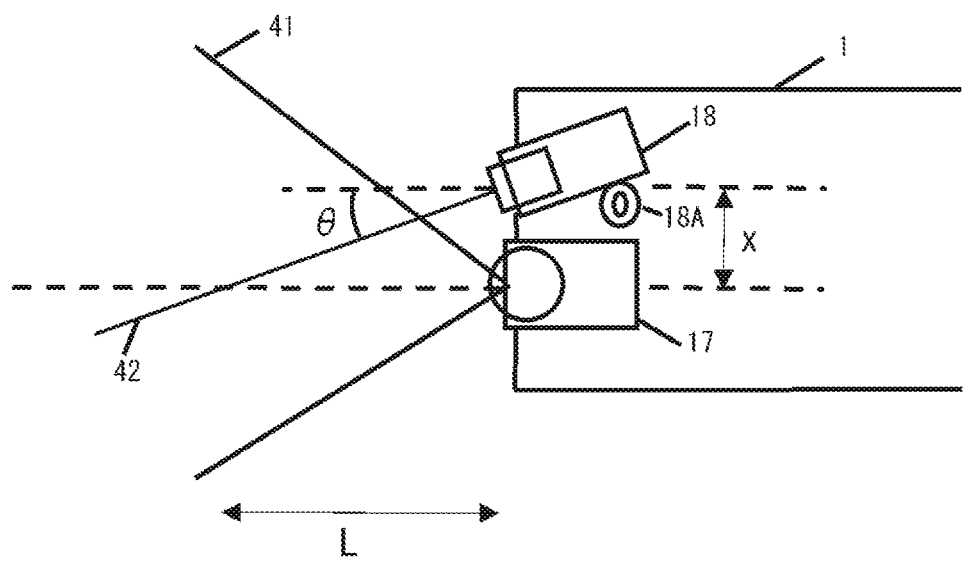
FIG. 4 shows a disposition of an imaging unit and a reading unit.

Next, the placement of the imaging unit 17 and the reading unit 18 will be described with reference to FIG. 4. FIG. 4 shows the placement of the imaging unit 17 and the reading unit 18.

As shown in FIG. 4, in the present embodiment, the emission direction of the scanning light is set via the reading unit 18 being disposed so as to incline in relation to the imaging unit 17. In addition, the imaging unit 17 and the reading unit 18 are disposed such that the optical axis of the imaging unit 17 and the center in the scanning width direction of a scanning light 42 emitted by the reading unit 18 intersect at a distance L from the imaging unit 17. It is possible to change an angle θ at which the reading unit 18 is inclined by the drive unit 18A, and the distance L at which the optical axis and the center in the scanning width direction of the scanning light 42 intersect can be changed by changing the angle θ.

As mentioned earlier, the reading device 1 is configured so as to collectively acquire the code information of the bar code and the image of the object by performing imaging via the imaging unit 17 when the bar code is read by the reading unit 18. In order to realize such a configuration, it can be considered to make the emission direction of the scanning light from the reading unit 18 and the optical axis of the imaging unit 17 be parallel as shown in FIG. 5, but there are problems with such a configuration.

Figure 5:
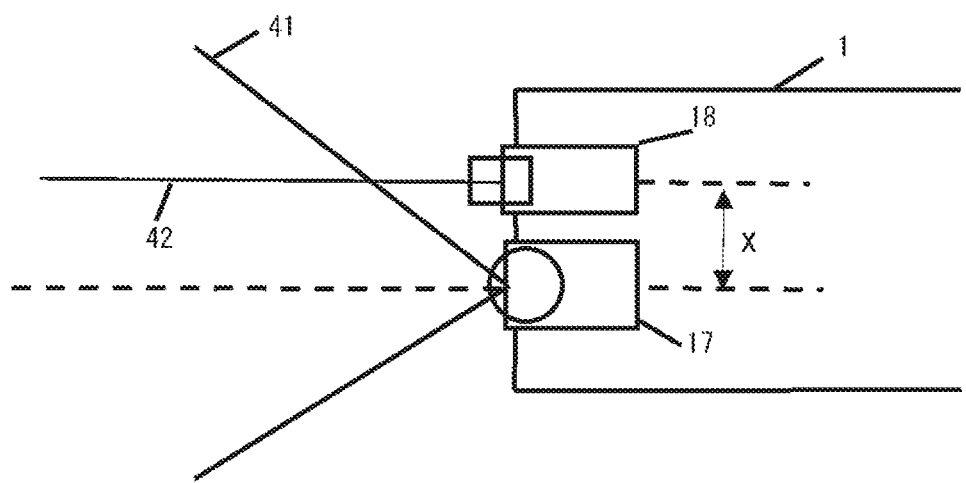
FIG. 5 shows a configuration in which the imaging unit and the reading unit are oriented in the same direction.

First, if the bar code is read using the configuration shown in FIG. 5, the reading by the reading unit 18 from the front surface of the object would be performed in a state that the optical axis of the imaging unit 17 is perpendicular to the object. However, when reading the bar code using the reflected light, it becomes no longer possible to read the bar code when light is emitted from the front surface. This is because, when the angle of incidence of the light is a right angle, the light that is reflected back is extremely bright, which makes it no longer possible to correctly read the code information. This area where reading is impossible is called a "dead zone."

Furthermore, in the configuration in FIG. 5, the center in the scanning width direction of the scanning light 42 from the reading unit 18 and the optical axis of the imaging unit 17, i.e., the center of an angle of view 41, are separated from each other. In such a configuration, there is a problem in that, depending on the location of the bar code displayed on the object, the object will not fall within the angle of view 41 of the imaging unit 17, or even if the object falls within the angle of view 41, the object is skewed toward one part of the angle of view 41, which can lead to unnatural white spaces.

Based on the above, as shown in FIG. 4, the imaging unit 17 and the reading unit 18 are disposed such that the optical axis of the imaging unit 17 and the center in the scanning width direction of the scanning light 42 from the reading unit 18 intersect.

In addition, the three values shown in FIG. 4 of the distance L at which the center in the scanning width direction of the scanning light 42 and the optical axis intersect, a distance X between the imaging unit 17 and the reading unit 18, and the angle θ at which the reading unit 18 inclines with respect to the imaging unit 17 are dependent on each other. Thus, the reading device 1 is configured such that it is possible to change the angle θ in accordance with the distance L and the distance X. Although the present embodiment is configured such that the angle θ is changed by controlling the drive unit 18A via the CPU 11, it is not absolutely necessary to include the drive unit 18A, and the angle θ may be changed by the user manually. In a case in which the distance L to the object is assumed ahead of time to be a prescribed value, the angle θ may be matched up with the distance L without being changed.

Figure 6:
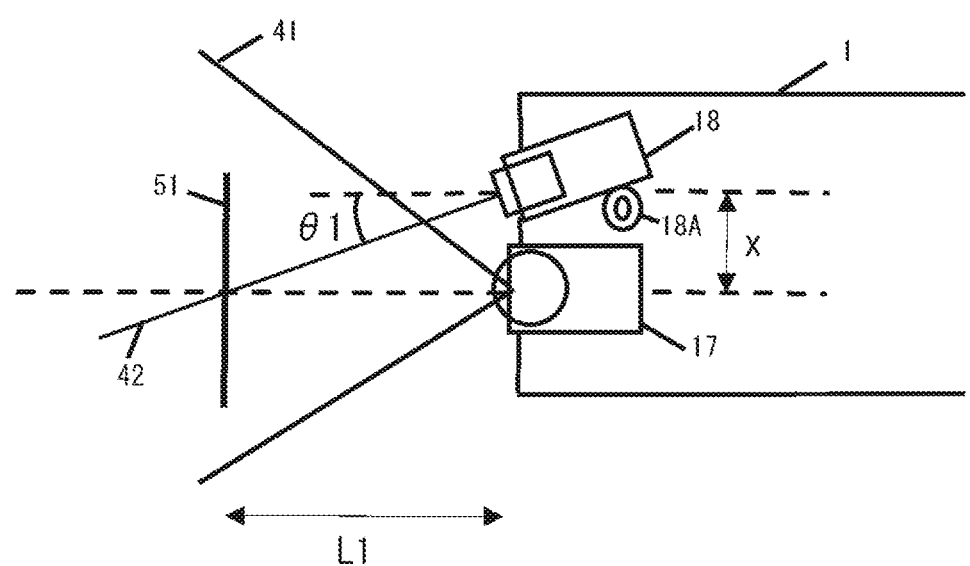
FIG. 6 shows a (first) relationship between a distance to an object and the reading unit.
Figure 7:
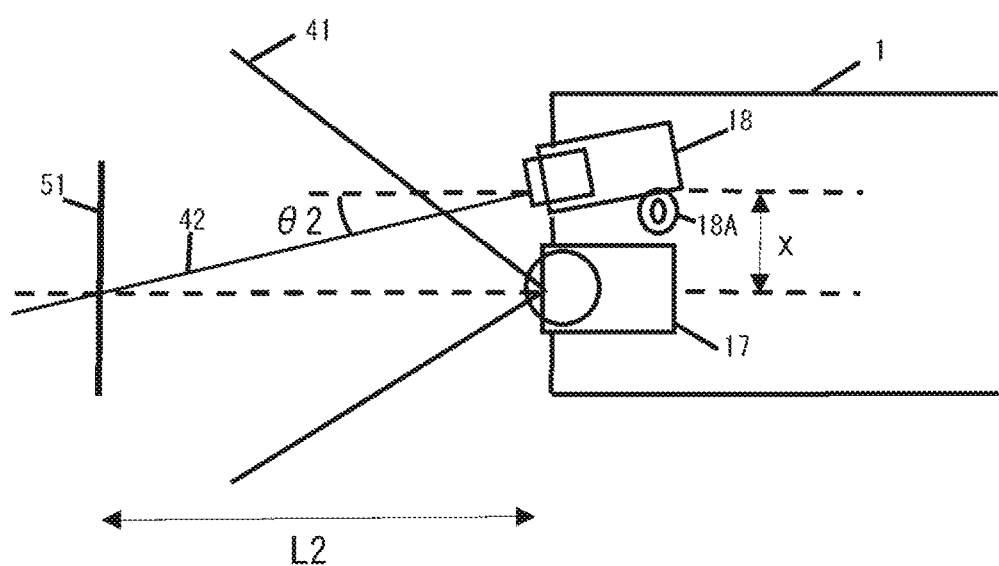
FIG. 7 shows a (second) relationship between the distance to the object and the reading unit.

Next, the relationship between the distance L to the object and the reading unit 18 will be explained with reference to FIGS. 6 and 7. FIGS. 6 and 7 show the relationship between the distance L to the object and the reading unit 18.

As shown in FIG. 6, since an object 51 is disposed at a distance L1 from the imaging unit 17, the reading unit 18 is inclined with respect to the imaging unit 17 at an angle θ1. As a result, the emission direction of the scanning light 42 is set such that the optical axis and the center in the scanning width direction of the scanning light 42 intersect at the distance L1.

As a result of this setting, the optical axis of the imaging unit 17 and the center in the scanning width direction of the scanning light 42 intersect at the distance L1, or in other words, on the object 51. Therefore, using FIGS. 8 to 10 to explain in more detail, when the bar code is irradiated with the scanning light 42 at the time of reading the bar code displayed on the object 51, it is possible to image by the imaging unit 17 the bar code being captured at the center of the angle of view 41. In addition, the scanning light 42 irradiates the bar code from an oblique direction.

Similarly, in FIG. 7, since the object 51 is disposed at a distance L2 that is farther than the distance L1, the reading unit 18 is inclined at an angle θ2 with respect to the imaging unit 17. As a result, the emission direction of the scanning light 42 is set such that the optical axis and the center in the scanning width direction of the scanning light 42 intersect at the distance L2. As a result of this setting, the optical axis of the imaging unit 17 and the center in the scanning width direction of the scanning light 42 intersect on the object 51. In addition, the scanning light 42 irradiates the bar code from an oblique direction.

Figure 8:
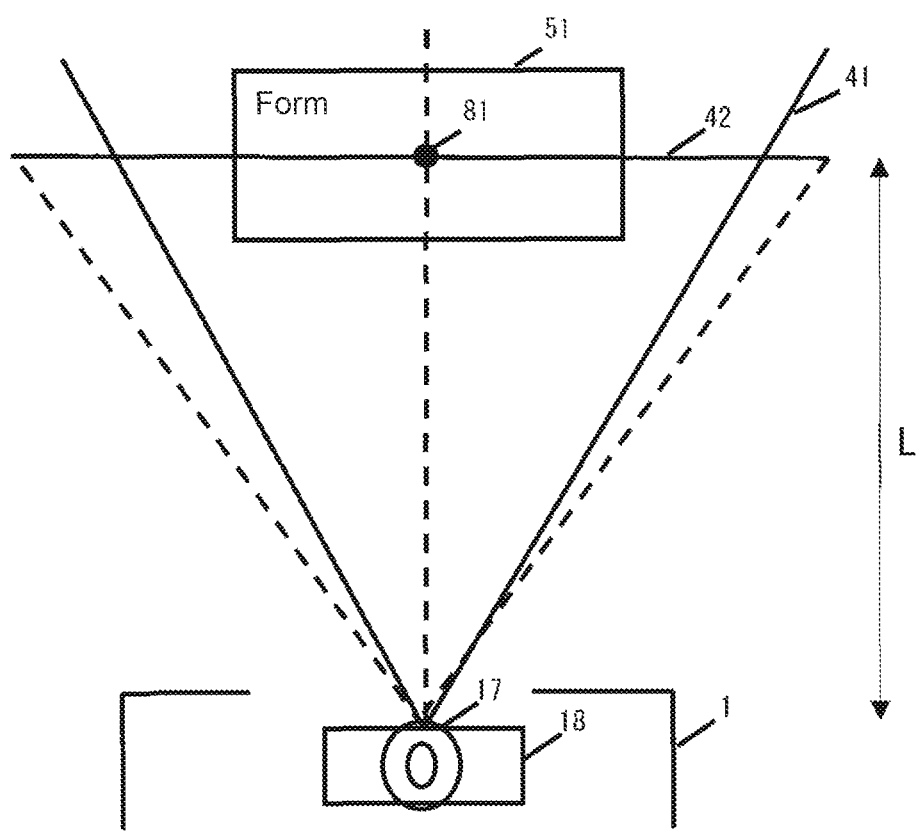
FIG. 8 shows a positional relationship between an angle of view according to the imaging unit and a scanning light via the reading unit.

Next, a positional relationship between the angle of view of the imaging unit 17 and the scanning light of the reading unit 18 will be described with reference to FIG. 8. FIG. 8 shows the positional relationship between the angle of view of the imaging unit 17 and the scanning light of the reading unit 18.

As shown in FIG. 8, it can be seen that the center in the scanning width direction of the scanning light 42 and the center in the scanning width direction of the angle of view 41 intersect at a point 81 at the distance L from the imaging unit 17. This is because, as explained for FIGS. 6 and 7, the emission direction of the scanning light 42 is set by setting the angle θ of the reading unit 18 that corresponds to the distance L to the object. It is preferable that even if the distance L to the object changes, the angle θ be set accordingly such that the center in the scanning width direction of the scanning light 42 and the optical axis that is the center of the angle of view 41 intersect with each other on the object, i.e., at the updated distance L.

Figure 9:
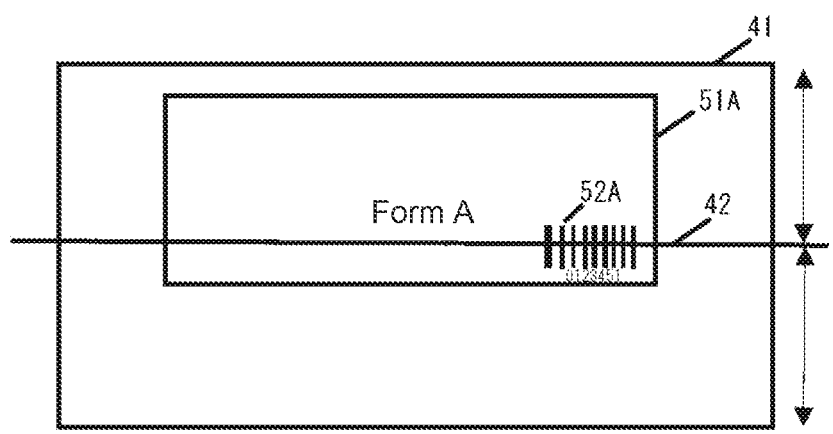
FIG. 9 shows a (first) instance in which reading of the object has been carried out.

Next, instances in which the object has been actually read will be described with reference to FIGS. 9 and 10. FIG. 9 shows an instance in which reading of the object has been actually carried out.

In FIG. 9, as an example of an object 51A, a form A, on which a bar code 52A is displayed in the lower right, is read and imaged. As shown in FIG. 9, when the scanning light 42 is aligned with the bar code 52A, it can be seen that the bar code is located at the exact vertical center of the vertical angle of view 41, and thus the object 51A falls within the angle of view 41. When reading is carried out by the reading device 1, since the object is imaged such that the bar code is located at the vertical center of the angle of view 41, white spaces appear, depending on the position at which the bar code of the object is displayed. For example, in FIG. 9, since the bar code 52A is displayed in the lower right of the object 51A, a white space has appeared at the bottom of the angle of view 41, for example. It is preferable that this white space be altered by carrying out trimming or the like.

Figure 10:
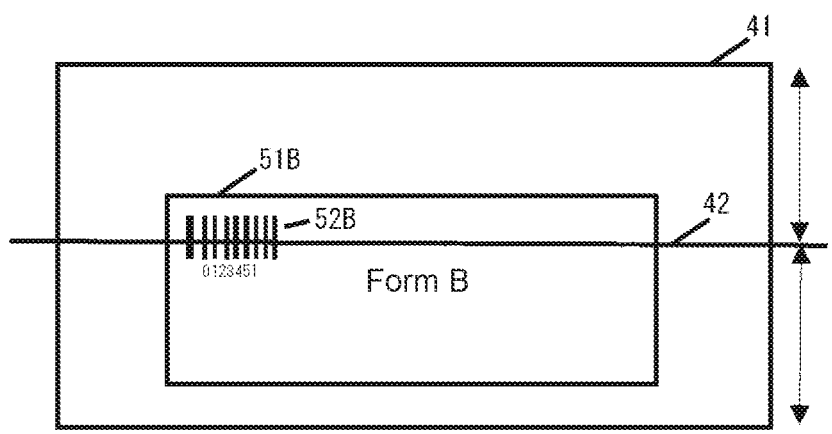
FIG. 10 shows a (second) instance in which reading of the object has been carried out.

In a similar manner in FIG. 10, as an example of an object 51B, a form B, on which a bar code 52B is displayed in the upper left, is read and imaged. As shown in FIG. 10, when the scanning light 42 is aligned with the bar code 52B, it can be seen that the bar code is located at the exact vertical center of the vertical angle of view 41, and thus the object 51B falls within the angle of view 41. In FIG. 10, since the bar code 52B is displayed in the upper left of the object 51B, a white space has appeared at the top of the angle of view 41. It is preferable that this white space be altered by carrying out trimming or the like as in FIG. 9.

According to FIGS. 9 and 10, since it is possible to carry out imaging such that the bar code moves to the vertical center of the angle of view regardless of where the bar code is displayed on the object 51, it becomes easier to capture the object within the angle of view of the imaging unit 17. In addition, since the reading unit 18 is disposed at an incline, it is possible to scan the bar code without worrying about dead zones since the scanning light 42 does not enter the bar code from straight on.

Figure 11:
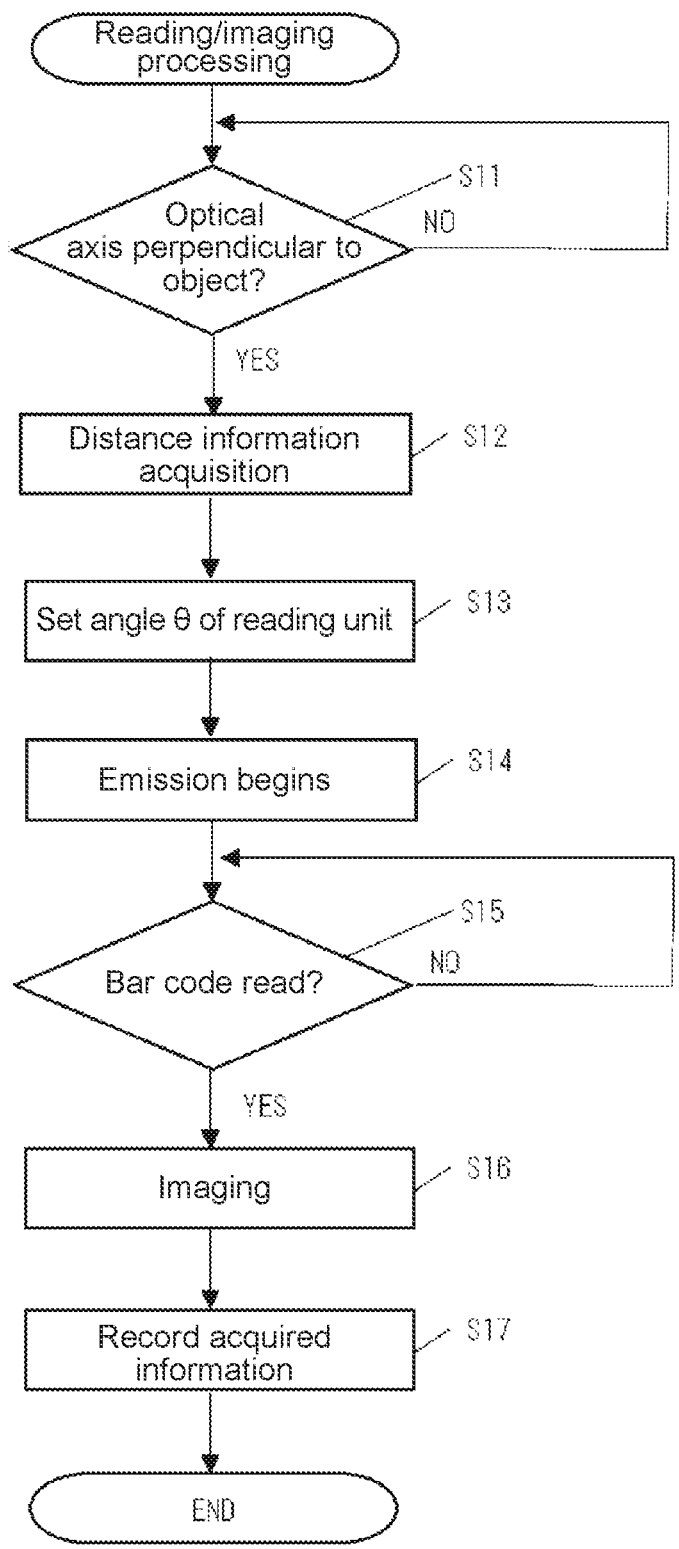
FIG. 11 is a flow chart illustrating reading and imaging processing.

Next, reading and imaging processing by the reading device 1 will be described with reference to FIG. 11. FIG. 11 is a flow chart illustrating reading and imaging processing. Reading and imaging processing is processing that occurs when bar codes are read by the reading device 1 and the object on which the bar code is displayed is imaged. This processing is carried out when operational input is input by a user via the operating unit 12. In other words, when trigger keys are being pressed, for example, as the operational input, processing is carried out, and when the pressing of the trigger keys ends, processing is finished.

First, the CPU 11 determines whether the optical axis of the imaging unit 17 is perpendicular with respect to the object (Step S11). In other words, the CPU 11 functions as the perpendicular determination function 31. Since the determination method was described for FIG. 3, a description thereof is omitted here.

It is preferable that the device be configured such that when it is determined that the optical axis of the imaging unit 17 is perpendicular to the object in Step S11, the user is notified by the display unit 14 outputting a notification sound. The notification method is not limited to this, and an LED lamp may be provided so as to light the LED lamp while it is determined that the optical axis is perpendicular to the object, for example.

When the CPU 11 has determined that the optical axis of the imaging unit 17 is perpendicular to the object (Step S11; YES), the CPU 11 acquires the distance information from the imaging unit 17 to the object (Step S12). In other words, the CPU 11 functions as the distance information acquisition function 32. Since the acquisition method was described for FIG. 3, a description thereof is omitted here.

The CPU 11 then sets the emission direction of the scanning light by setting the angle θ at which the reading unit 18 inclines based on the acquired distance information (Step S13). In other words, it is possible to set the angle θ such that the center of the scanning light emitted from the reading unit 18 and the optical axis of the imaging unit 17 intersect on the object by using the acquired distance information. Once setting is completed, the emission of the scanning light by the reading unit 18 commences (Step S14). In other words, the CPU 11 functions as the reading control function 33.

Then, when emission of the scanning light has been confirmed, the user moves the reading device 1 and matches up the emitted scanning light with the bar code displayed on the object. At such time, as described for FIG. 3, it is necessary to move the reading device 1 parallel to the object.

Then, once the reading of the bar code is carried out by aligning the scanning light with the bar code (Step S15; YES), imaging is subsequently carried out by the imaging unit 17 (Step S16). In other words, the CPU 11 functions as the imaging control function 34. As a result, it is possible to perform imaging such as that in FIGS. 9 and 10 in which the bar code is captured at the vertical center of the angle of view. The device may be configured such that, when imaging is actually carried out, the emission of the scanning light stops. As a result, it is possible to avoid the scanning light from being captured in the acquired image. Then, the code information of the bar code acquired by the reading unit 18 and the image acquired by the imaging unit 17 are recorded in the storage unit 15 as associated with each other (Step S17). In other words, the CPU 11 functions as the information management function 35.

According to the present embodiment above, the reading device 1 includes: the imaging unit 17 that acquires an image by imaging an object; and the reading unit 18 that emits a scanning light formed of a light beam that has a scanning width in a prescribed one-dimensional direction by using a light source that generates the light beam, and reads code information included in the object. The imaging unit 17 and the reading unit 18 are disposed such that the center in the scanning width direction of the scanning light and the optical axis of the imaging unit 17 intersect at a prescribed location.

As a result, it is possible to collectively carry out reading the code information included in the object and imaging the object.

In addition, the placement of the imaging unit 17 and the reading unit 18 of the reading device 1 is determined in accordance with the distance between the reading unit 18 and the imaging unit 17 and the distance between the imaging unit 17 and the object. As a result, it is possible to determine the placement of the imaging unit and the reading unit.

In addition, the reading device 1 includes: the imaging unit 17 that acquires an image by imaging an object; the reading unit 18 that emits a scanning light formed of a light beam that has a scanning width in a prescribed one-dimensional direction by using a light source that generates the light beam, and reads code information included in the object; a determination unit that determines whether the optical axis of the imaging unit 17 and the object are perpendicular; and an acquisition unit that, when it is determined that the optical axis of the imaging unit 17 and the object are perpendicular, acquires distance information indicating the distance from the imaging unit 17 to the object. The reading unit 18 changes the emission direction of the scanning light in accordance with the distance information acquired by the acquisition unit so that the center in the scanning width direction of the scanning light and the optical axis of the imaging unit 17 intersect on the object. Thus, it is possible to more easily ensure that the object is captured in the angle of view.

The reading device 1 further includes the notification unit that performs notification when it is determined by the determination unit that the optical axis of the imaging unit 17 and the object are perpendicular. Thus, the user can be notified of the status.

The reading device 1 acquires the distance information indicating the distance from the imaging unit 17 to the object via operational input by the user. Thus, it is possible to easily acquire the necessary distance information.

Alternatively, the reading device 1 acquires the distance information indicating the distance from the imaging unit 17 to the object by a distance measuring sensor. Thus, it is possible to easily acquire the necessary distance information.

The description in the embodiment above is one example of a reading device of the present invention, and the present invention is not limited to this.

In the above-mentioned embodiment, the imaging unit 17 and the reading unit 18 were disposed and arranged in the vertical direction; however, the present invention is not limited to this, and the imaging unit 17 and reading unit 18 may be disposed and arranged in another direction. In such a case, similar to the embodiment above, it is preferable that the reading unit 18 and the imaging unit 17 be disposed such that the center in the scanning width direction of the scanning light of the reading unit 18 overlaps the optical axis that is the center of the angle of view of the imaging unit 17.

In addition, in the above-mentioned embodiment, the placement of the imaging unit 17 and the reading unit 18 was described. However, it is not absolutely necessary that the imaging unit 17 and the reading unit 18 be disposed as described above, and it is sufficient that the relationship between the angle of view of the imaging unit 17 and the scanning light emitted by the reading unit 18 are realized as described in the above-mentioned embodiment. Thus, it is possible to realize the reading device 1 without specifically limiting the placement of the imaging unit 17 and the reading unit 18 themselves by adjusting the angle of view of the imaging unit 17 and the emission direction of the scanning light of the reading unit 18 by using a mirror, for example.

Furthermore, in the above-mentioned embodiment, the imaging unit 17 and the reading unit 18 were disposed such that the bar code is located at the center of the angle of view at the time of imaging; however, the present invention is not limited to this. The present invention may be configured such that the object fills the angle of view when imaging is performed at the time of reading the bar code by determining the placement of the imaging unit 17 and the reading unit 18 by additionally taking into account the size of the object and the location at which the bar code is displayed, for example.

Although the reading unit 18 was described as a laser scanner in the above-mentioned embodiment, the reading unit 18 may be another type of one-dimensional bar code scanner.

Embodiments of the present invention were described above, but the scope of the present invention is not limited to these and includes the scope of the invention as described in the claims and the equivalents thereto.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A reading device, comprising:
    a camera that acquires an image by imaging an object;
    a scanner that emits a light beam towards the object in a scanning manner to emit a scanning light having a prescribed scanning angle range in a one-dimensional prescribed direction, and that detects the scanning light reflected by the object so as to acquire a target information displayed on a surface of the object, an emission direction of the scanning light being changeable; and
    a processor that performs:
        determining whether or not the surface of the object and an optical axis of the camera are perpendicular to each other;

when the surface of the object and the optical axis of the camera are determined to be perpendicular to each other, acquiring distance information indicating a distance from the camera to the object; and causing the scanner to change the emission direction of the scanning light in accordance with the acquired distance information such that a center line of the prescribed scanning angle range of the scanning light and the optical axis of the camera intersect with each other on the surface of the object.

2. The reading device according to claim 1, wherein the processor further performs:

causing the scanner to emit the scanning light to the object in the changed emission direction so as to acquire the target information displayed on the surface of the object; and thereafter, causing the camera to image the object.

3. The reading device according to claim 2, further comprising a memory, wherein the processor causes the memory to store the target information acquired by the scanner and the image acquired by the camera as associated with each other.

4. The reading device according to claim 2, wherein the processor causes a user to be notified when the processor determines that the surface of the object and the optical axis of the camera are perpendicular to each other.

5. The reading device according to claim 2, wherein said distance information is inputted to the processor via an operational input of a user.

6. The reading device according to claim 2, further comprising a distance measuring sensor that detects the distance to the object to generate the distance information.

7. The reading device according to claim 2, wherein the processor acquires the distance information indicating the distance from the camera to the object by causing the camera to image the object and analyzing the image of the object.

8. A reading device, comprising:

a camera that acquires an image by imaging an object; and a scanner that emits a light beam towards the object in a scanning manner to emit a scanning light having a prescribed scanning angle range in a one-dimensional prescribed direction, and that detects the scanning light reflected by the object so as to acquire a target information displayed on a surface of the object, an emission direction of the scanning light being changeable; and a processor that performs:

acquiring distance information indicating a distance from the camera to the object; and causing the scanner to change the emission direction of the scanning light in accordance with the acquired distance information such that a center line of the prescribed scanning angle range of the scanning light and an optical axis of the camera intersect with each other on the surface of the object.

9. A method executed by a processor in a reading device that includes, in addition to the processor: a camera that acquires an image by imaging an object; and a scanner that emits a light beam towards the object in a scanning manner to emit a scanning light having a prescribed scanning angle range in a one-dimensional prescribed direction, and that detects the scanning light reflected by the object so as to acquire a target information displayed on a surface of the object, an emission direction of the scanning light being changeable, the method comprising, via the processor, determining whether or not the surface of the object and an optical axis of the camera are perpendicular to each other;

when the surface of the object and the optical axis of the camera are determined to be perpendicular to each other, acquiring distance information indicating a distance from the camera to the object; and causing the scanner to change the emission direction of the scanning light in accordance with the acquired distance information such that a center line of the prescribed scanning angle range of the scanning light and the optical axis of the camera intersect with each other on the surface of the object.

10. A non-transitory storage medium having computer-executable instructions stored therein, the instructions being readable by a processor in in a reading device that includes, in addition to the processor: a camera that acquires an image by imaging an object; and a scanner that emits a light beam towards the object in a scanning manner to emit a scanning light having a prescribed scanning angle range in a one-dimensional prescribed direction, and that detects the scanning light reflected by the object so as to acquire a target information displayed on a surface of the object, an emission direction of the scanning light being changeable, the instructions causing the processor to execute the following:

determining whether or not the surface of the object and an optical axis of the camera are perpendicular to each other;

when the surface of the object and the optical axis of the camera are determined to be perpendicular to each other, acquiring distance information indicating a distance from the camera to the object; and causing the scanner to change the emission direction of the scanning light in accordance with the acquired distance information such that a center line of the prescribed scanning angle range of the scanning light and the optical axis of the camera intersect with each other on the surface of the object.

* * * * *